(12) United States Patent
Hirao et al.

(10) Patent No.: US 7,631,882 B2
(45) Date of Patent: Dec. 15, 2009

(54) VEHICLE HEIGHT ADJUSTMENT DEVICE AND VEHICLE HEIGHT ADJUSTMENT METHOD

(75) Inventors: Satoshi Hirao, Kanagawa (JP); Susumu Kawahata, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 260 days.

(21) Appl. No.: 11/587,818

(22) PCT Filed: Apr. 27, 2005

(86) PCT No.: PCT/JP2005/008473

§ 371 (c)(1),
(2), (4) Date: Oct. 27, 2006

(87) PCT Pub. No.: WO2005/105491

PCT Pub. Date: Nov. 10, 2005

(65) Prior Publication Data

US 2008/0018065 A1 Jan. 24, 2008

(30) Foreign Application Priority Data

Apr. 28, 2004 (JP) ............................. 2004-132582

(51) Int. Cl.
*B60G 17/00* (2006.01)

(52) U.S. Cl. .............. 280/6.157; 280/5.514; 280/86.75; 280/86.751; 280/86.752; 280/93.511; 280/93.512; 280/124.134; 280/124.145; 280/124.147; 280/124.151; 280/124.154; 280/124.164; 280/124.179; 267/166; 267/248; 267/255; 267/286; 267/287

(58) Field of Classification Search ............ 188/322.21; 280/5.514, 6.157, 86.752, 124.147, 124.164, 280/86.751, 124.145, 124.134, 137.506, 280/93.512, 86.75, 76.752, 93.511, 124.151, 280/124.154, 124.179; 267/166, 216, 248, 267/255, 286, 287

See application file for complete search history.

(56) References Cited

U.S. PATENT DOCUMENTS 2,661,206 A 12/1953 Gregoire (Continued)

FOREIGN PATENT DOCUMENTS

DE 38 39 433 10/1989

(Continued)

OTHER PUBLICATIONS

International Preliminary Report on Patentability, mailed Nov. 23, 2006 and issued in corresponding International Patent Application No. PCT/JP2005/008473.

(Continued)

*Primary Examiner*—Ruth Ilan
*Assistant Examiner*—James English
(74) *Attorney, Agent, or Firm*—Staas & Halsey LLP

(57) ABSTRACT

A vehicle height adjustment device has an adjustment bolt (30) rotatably supported by or fixed to a wheel-side member or a vehicle-body member, and a spring seat member (10) threadedly engaging with the adjustment bolt. Rotation of the spring seat member is limited by a bump rubber pedestal (41) (or a coil spring bracket (9)). Displacement of the spring seat member occurs in an axial direction of rotation of the bolt, in accordance with rotation of the bolt. According to the present invention, rotation of the spring seat involved in rotation of the bolt for adjusting the vehicle height can be restricted, and a construction of a vehicle height adjustment mechanism can be simplified so that the number of parts or members of the device is reduced.

14 Claims, 6 Drawing Sheets

U.S. PATENT DOCUMENTS

| | | | |
|---|---|---|---|
| 3,830,482 | A | 8/1974 | Norris |
| 3,871,682 | A | 3/1975 | Kirschner et al. |
| 4,474,363 | A * | 10/1984 | Numazawa et al. ............ 267/34 |
| 4,721,325 | A * | 1/1988 | Mackovjak et al. ... 280/124.155 |
| 5,036,941 | A | 8/1991 | Denzin et al. |
| 5,265,902 | A * | 11/1993 | Lewis .................. 280/124.102 |
| 5,333,645 | A * | 8/1994 | Galazin ................... 137/627.5 |
| 5,335,695 | A * | 8/1994 | Pierce ..................... 137/627.5 |
| 5,676,355 | A * | 10/1997 | Hayashi et al. ............. 267/221 |
| 6,398,201 | B1 * | 6/2002 | Solomond et al. ........... 267/220 |
| 6,412,798 | B2 * | 7/2002 | De Fontenay et al. . 280/124.147 |
| 6,749,047 | B2 * | 6/2004 | Koyano et al. ......... 188/321.11 |
| 2003/0218286 | A1 * | 11/2003 | Miyazaki et al. ............ 267/220 |
| 2004/0036206 | A1 | 2/2004 | Loser et al. |
| 2004/0075350 | A1 | 4/2004 | Kuhnel |

FOREIGN PATENT DOCUMENTS

| | | |
|---|---|---|
| DE | 298 02 939 | 4/1998 |
| FR | 383.897 | 3/1908 |
| JP | 58-106211 | 7/1983 |
| JP | 61-14889 | 5/1986 |
| JP | 2000-142062 | 5/2000 |
| JP | 3193914 | 5/2001 |
| JP | 2001-171322 | 6/2001 |

OTHER PUBLICATIONS

European Supplementary Search Report for corresponding European application 05738926.4 mailed on May 14, 2008.

* cited by examiner

FIG.4
(A)
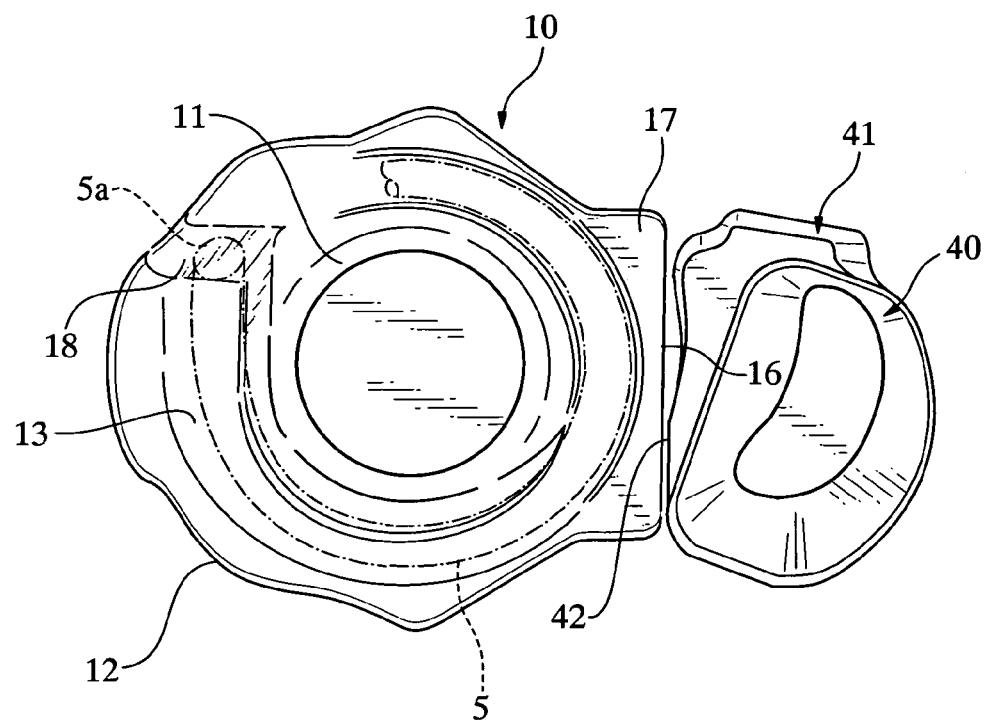
(B)
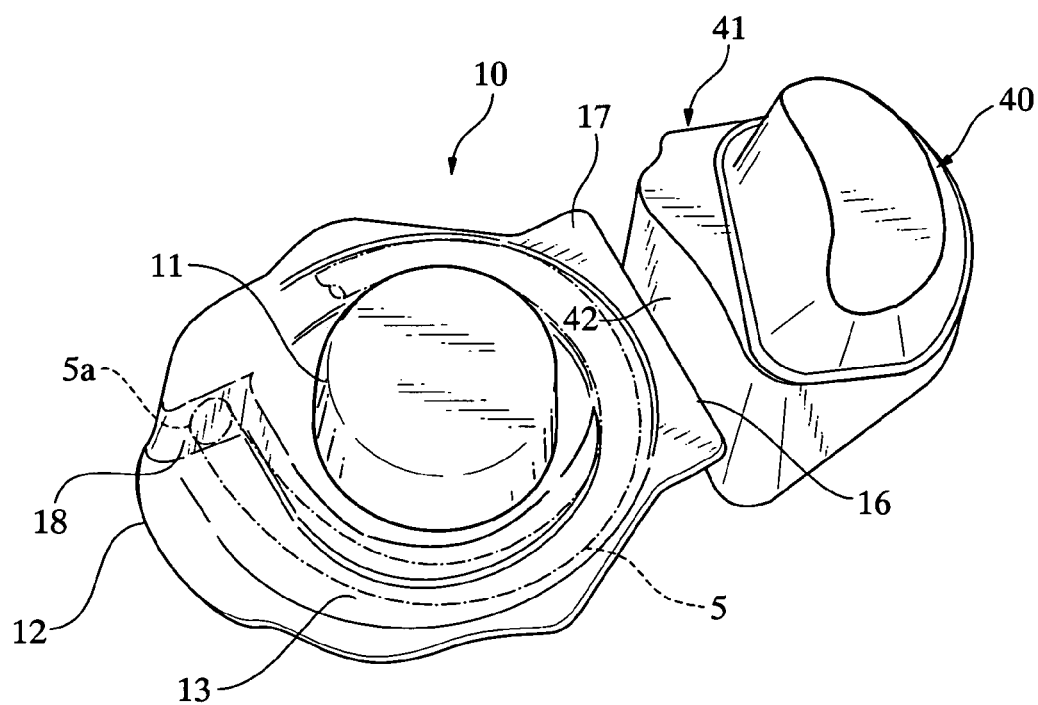

FIG.5
(A)
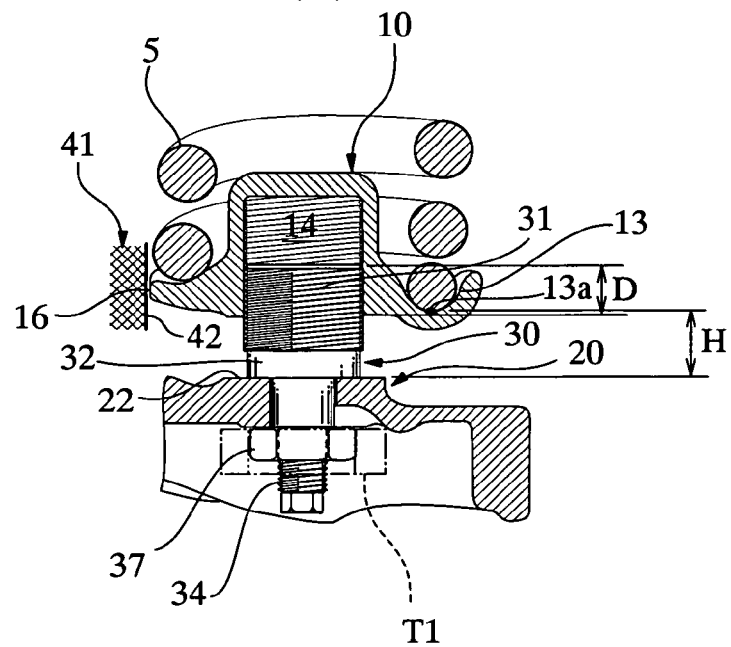
(B)
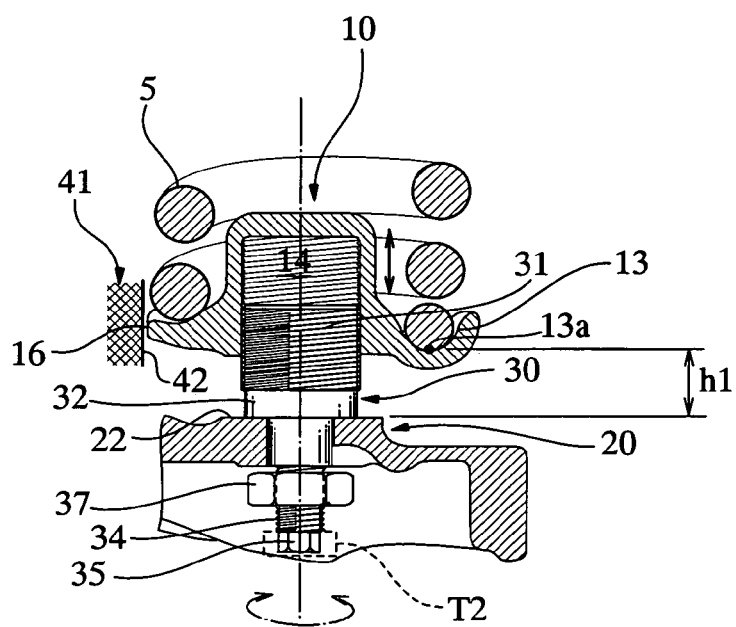

FIG.6
(A)
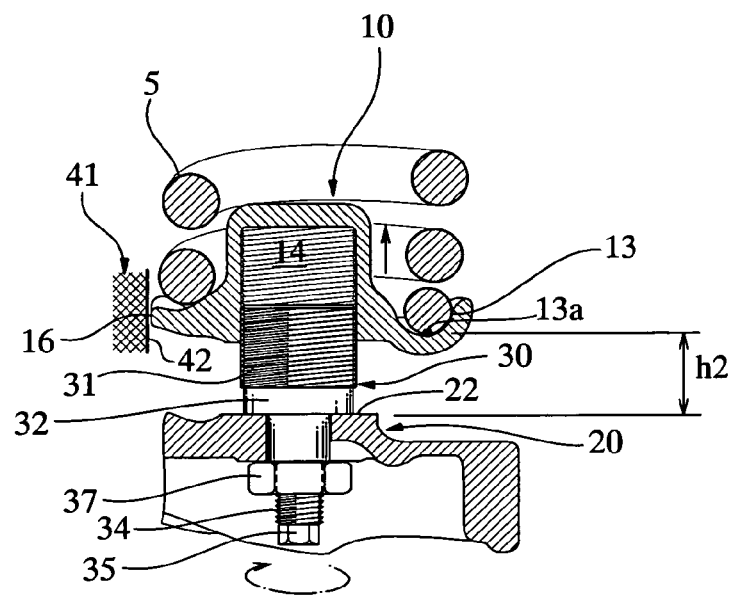
(B)
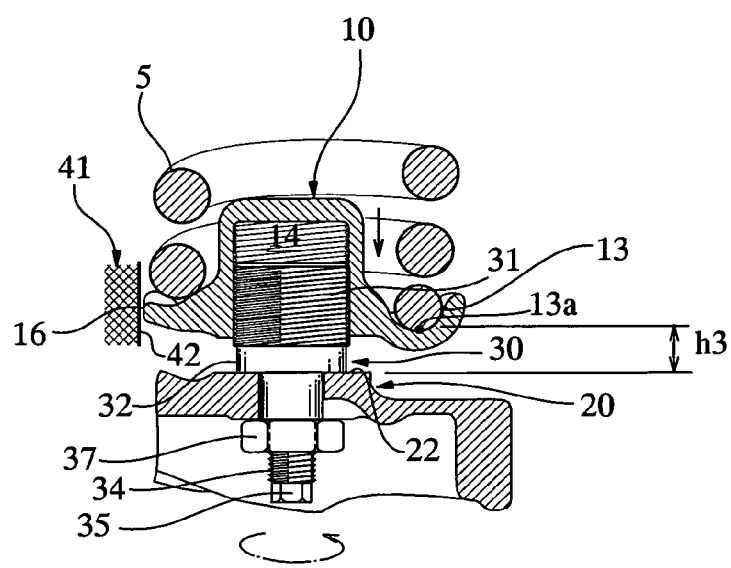

VEHICLE HEIGHT ADJUSTMENT DEVICE AND VEHICLE HEIGHT ADJUSTMENT METHOD

This application claims the benefit of PCT International Application No. PCT/JP2005/008473 filed Apr. 27, 2005 and Japanese Application No. 2004-132582, filed Apr. 28, 2004 in Japan, the contents of which are incorporated herein by reference.

TECHNICAL FIELD

The present invention relates to vehicle height adjustment device and method for a suspension system, and more specifically, to such a device and method for adjusting the vehicle height by regulating a position of a spring seat member which abuts against an end portion of a compression coil spring interposed between a wheel-side member carrying a wheel and a vehicle-body member.

TECHNICAL BACKGROUND

A vehicle suspension system is known in the art, which has a compression coil spring interposed between a wheel-side member and a vehicle-body member, wherein upper and lower spring seats are provided for respectively supporting upper and lower end portions of the spring, and wherein a vehicle height adjustment device is equipped for adjusting the vehicle height by regulating a position of the spring seat.

For example, Japanese patent publication No. 3,193,914 (JP 3,193,914 B) discloses a device for adjusting a vehicle height, which comprises a lower lock nut fixedly mounted on a lower arm; an upper lock nut threadedly engaging with the lower lock nut; a shank with an outer thread extending through the lower lock nut; and a spring seat integrally formed on the shank. In such a vehicle height adjustment device, the outer thread of the shank threadedly engages with an inner thread of the lower lock nut. The spring seat vertically, moves in dependence on rotation of the shank.

Further, Japanese patent application laid-open publication No. 2000-142062 (JP 2000-142062 A) discloses a device for adjusting a vehicle height, which comprises a spring seat holder fixedly mounted on a vehicle-body member, an adjustment bolt extending through the holder and threadedly engaging with the holder, and a spring seat abutting against the tip end portion of the adjustment bolt. In a condition that the bolt extends through and threadedly engages with the holder, the bolt rotates so that displacement of the bolt is caused in an axial direction of rotation. The spring seat is pressed by or released from the tip end portion of the bolt, so that the spring seat vertically moves under guidance of the spring seat holder.

In the vehicle height adjustment device as described in JP 3,193,914 B, the spring seat is integrally mounted on the shank functioning as a vehicle height adjustment bolt and is rotated together with the shank in adjustment operation of the vehicle height. However, a resilient repulsive force of a compression coil spring, which is not rotatable, normally acts on the spring seat. Therefore, in order to smoothly rotate the spring seat without rotation of the spring, a particular fabrication is required for enabling an end portion of the spring and the spring seat to relatively rotate in their contact surfaces. Thus, a manufacturing process of such a vehicle height adjustment device requires a number of manufacturing steps or a complicated manufacturing process.

On the other hand, the vehicle height adjustment device as described in JP 2000-142062 A has the spring seat and the adjustment bolt separated from each other. A torque of the bolt is converted to a pressure in an axial direction of rotation of the bolt at a contact point between the bolt and the seat. Therefore, displacement of the spring seat can be caused in the axial direction of rotation of the bolt, without rotation of the spring seat.

However, in a case of such an arrangement, the spring seat and the bolt are structurally separated from each other, and therefore, it is necessary to provide means for guiding the spring seat in the axial direction of rotation of the bolt and stabilizing a position of the spring seat. Thus, the vehicle height adjustment device as disclosed in JP 2000-142062 A is provided with a spring seat holder in position, which threadedly engages with the bolt and guides the spring seat, in addition to the bolt and the spring seat. As a result, such a type of vehicle height adjustment device requires a complicated construction of the device and a number of parts or members for the device.

An object of the present invention is to provide vehicle height adjustment device and method for a vehicle suspension system, which can restrict rotation of a spring seat associated with rotation of a vehicle height adjustment bolt and which can simplify a construction of the vehicle height adjustment mechanism, thereby reducing the number of parts or members for the device.

DISCLOSURE OF THE INVENTION

In order to achieve the aforementioned object, the present invention provides a vehicle height adjustment device for a vehicle suspension system having a compression coil spring interposed between a wheel-side member carrying a wheel and a vehicle-body member, which regulates a position of a spring seat member abutting against an end portion of the spring, so as to adjust a vehicle height, comprising:

an adjustment bolt which is rotatably supported by the wheel-side member or the vehicle-body member and which is able to be fixedly secured to the wheel-side member or the vehicle-body member; and the spring seat member which threadedly engages with said bolt, wherein rotation of said spring seat member is limited by a component of the wheel-side member or the vehicle-body member for causing a relative displacement of said spring seat member in an axial direction of rotation of said bolt in accordance with rotation of the bolt, and wherein said bolt is securely fastened to the wheel-side member or the vehicle-body member for fixing a position of said spring seat member.

According to the aforementioned arrangement of the present invention, the spring seat member threadedly engages with the adjustment bolt and the position of the spring seat member is stabilized by securely fastening the bolt to the wheel-side member or the vehicle-body member. The relative position between the spring seat member and the bolt is not changed unless the bolt is rotated. On the other hand, displacement of the spring seat member can be caused in the axial direction of rotation of the bolt by rotation of the bolt, when the bolt is released from the wheel-side member or the vehicle-body member. Since rotation of the spring seat member is restricted by the component of the wheel-side member or the vehicle-body member disposed in position adjacent to the upper and lower end portion of the spring, the spring seat member and the bolt move relatively toward each other in the axial direction of rotation with rotation of a screw in a tightening direction, and move relatively apart from each other in the axial direction of rotation with rotation of the screw in a loosening direction.

Therefore, according to the present invention, the rotation of the spring seat associated with the rotation of the bolt can be restricted without structural separation of the bolt from the spring seat, and the spring seat holder can be eliminated to simplify the construction of the device and to reduce the number of parts or members of the device.

In a preferred embodiment of the present invention, the spring seat member is provided with a recess with an internal thread (female thread) formed therein, and the adjustment bolt has a screw part to be inserted into the recess. The screw part is provided with an external thread (male thread) threadedly engageable with the internal thread of the recess. Preferably, a diameter of the screw part is set to be greater than that of the shank of the bolt fixedly mounted on the wheel-side or vehicle-body member. More preferably, the core section of the spring seat member formed with the recess extends into a hollow inside area of the compression coil spring. In the core section, the recess is formed with the internal thread having a sufficient screw length. If such diameter and length of the screw are ensured, the spring seat member can be further stabilized.

Preferably, the adjustment bolt has a large-diameter screw part threadedly engaging with the aforementioned recess; a shank with a relatively small diameter connected to or continuous with the large-diameter screw part; a small-diameter screw part connected to or continuous with the shank; and rotating tool engagement means provided on an end portion of the small-diameter screw part. The large-diameter screw part, shank, small-diameter screw part and rotating tool engagement means are aligned with one another on an axis of rotation of the bolt. The shank is inserted through a through-hole formed in the wheel-side member or the vehicle-body member. The small-diameter screw part extends from the wheel-side or vehicle-body member on a side opposite to the spring. A screw-engaging member, such as a nut, threadedly engages with the small-diameter screw part. The bolt is fastened to the wheel-side or vehicle-body member by tightening the screw-engaging member and is rotated when the screw-engaging member is loosened or released. After the screw-engaging member is loosened or released, a rotating tool is engaged with the aforementioned engagement means. The bolt is rotated by the tool, whereby the spring seat member can be moved in an axial direction of rotation. If such an arrangement is applied to the bolt for the lower seat member, the vehicle height can be adjusted from the underside of the suspension system. This improves operability of the vehicle height adjustment. Such an arrangement allows the adjustment operation to be performed in the space below the suspension system, and therefore, works for the vehicle height adjustment are relieved. It is useful, particularly in a cab-over type truck which has a cockpit or the like located above the suspension system.

More preferably, a boss portion having the aforementioned through-hole is formed in the wheel-side member or the vehicle-body member. An annular journal surface can be provided on the adjustment bolt by a step formed in a transition between the large-diameter screw part and the small-diameter shank. It is desirable that the boss portion has a flat bearing surface abutting against this annular journal surface. Fixation of the bolt is further stabilized where the annular journal surface is seated on the bearing surface, and therefore, the positions of the large-diameter screw part and the spring seat member can be more precisely controlled and stabilized.

In one preferred embodiment of this invention, the aforementioned wheel-side member is a lower arm, and the aforementioned component of the wheel-side or vehicle-body member is a bump rubber pedestal or a coil spring bracket. This component may be another appropriate portion, part or member which can function as detent means for limiting the rotation of the spring seat member. For example, a protrusion or projection may be provided on the lower arm so as to restrict the rotation of the spring seat member, and it can be used as the aforementioned component of the wheel-side member. The component of the wheel-side or vehicle-body member functioning as the detent means is not limited to such an element, but can be suitably designed, depending on the type of the suspension system or the like.

From another aspect, the present invention provides a vehicle height adjustment device for a vehicle suspension system having a compression coil spring interposed between a wheel-side member carrying a wheel and a vehicle-body member, which regulates a position of a spring seat member abutting against an end portion of the spring, so as to adjust a vehicle height, comprising:

an adjustment bolt which is rotatably supported by the wheel-side member or the vehicle-body member and which is able to be fixedly secured to the wheel-side member or the vehicle-body member;

the spring seat member which threadedly engages with said bolt; and rotation restriction means provided on the wheel-side member or the vehicle-body member for restricting rotation of the spring seat member by abutting against the rotated spring seat member;

wherein said spring seat member is provided with a recess in which a thread is formed;

wherein said bolt is provided with a large-diameter screw part threadedly engaging with said recesses, a small-diameter shank connected to or continuous with said large-diameter screw part, securing means for releasably fastening the small-diameter shank to the wheel-side member or the vehicle-body member, and engagement means for engaging with a rotating tool for rotating said shank; and wherein said shank extends through a through-hole formed in the wheel-side member or the vehicle-body member.

Preferably, the wheel-side member or the vehicle-body member is formed with a bearing surface, which is in plane contact with a step formed in a transition between the large-diameter screw part and the small-diameter shank so as to rotatably carry the bolt on the wheel-side member or the vehicle-body member. More preferably, the step forms an annular journal surface which is seated on the bearing surface.

Preferably, the aforementioned securing means co-operates with the step so as to clamp the wheel-side or vehicle-body member and to fasten the bolt thereto. The aforementioned engagement means is preferably positioned on the bolt for engagement with a rotating tool on a side of the wheel-side or vehicle-body member opposite to the large-diameter screw part.

The present invention also provides a method for adjusting a vehicle height with use of a vehicle suspension system, in which a suspension system has a compression coil spring interposed between a wheel-side member carrying a wheel and a vehicle-body member, and a position of a spring seat member abutting against an end portion of the spring is regulated so as to adjust a vehicle height, comprising steps of:

releasing and rotating an adjustment bolt rotatably supported on said wheel-side or vehicle-body member and threadedly engaging with said spring seat member;

restricting rotation of the spring seat member by abutment of the spring seat member against a component of the wheel-side or vehicle-body member, for converting a torque exerted on the bolt to a motion of the spring seat member in an axial direction of rotation, thereby causing displacement of said spring seat member in the axial direction of rotation of said bolt; and securing said bolt on the wheel-side or vehicle-body member.

According to such an arrangement of the present invention, displacement of the spring seat member can be caused in the axial direction of rotation of the adjustment bolt by rotation of the bolt. The relative displacement between the spring seat member and the bolt occurs so as to move toward each other in the axial direction of rotation when a tightening torque is applied to the bolt, whereas it occurs so as to move apart from each other in the axial direction of rotation when a loosening torque is applied to the bolt. According to such a method for adjusting a vehicle height, a vehicle height adjustment mechanism can be provided in the suspension system by provision of the bolt on the wheel-side or vehicle-body member, suitable design of the position and shape of the component of the wheel-side or vehicle-body member, and suitable design of the position and shape of the spring seat member. Therefore, the construction of the vehicle height adjustment mechanism can be considerably simplified.

Preferably, a through-hole, through which the shank of the bolt can be inserted, is formed in the wheel-side or vehicle-body member, so that the shank externally protrudes through the through-hole from the wheel-side or vehicle-body member on the side opposite to the spring seat member, whereby the bolt is released, rotated and fastened on the side opposite to the spring seat member. For example, the spring seat member is a lower seat member supporting the lower end portion of the coil spring, and release, rotation and fastening of the bolt are performed from the underside of the suspension system.

The term reading "vehicle-body member" means a sprung member on the suspension system or a member having its weight supported by the spring. The term reading "wheel-side member" means a member unsprung by the suspension system or a member on which the weight of the vehicle body acts through the spring.

BRIEF DESCRIPTION OF THE DRAWINGS

FIG. 4 includes a plan view and a perspective view which show a positional relationship between a lower seat member and a bump rubber pedestal; and FIGS. 5 and 6 are cross-sectional views illustrating a relative displacement between the lower seat member and an adjustment bolt.

BEST MODE FOR CARRYING OUT THE INVENTION

One preferred embodiment of the present invention is described in detail hereinafter, with reference to the accompanying drawings.

Figure 1:
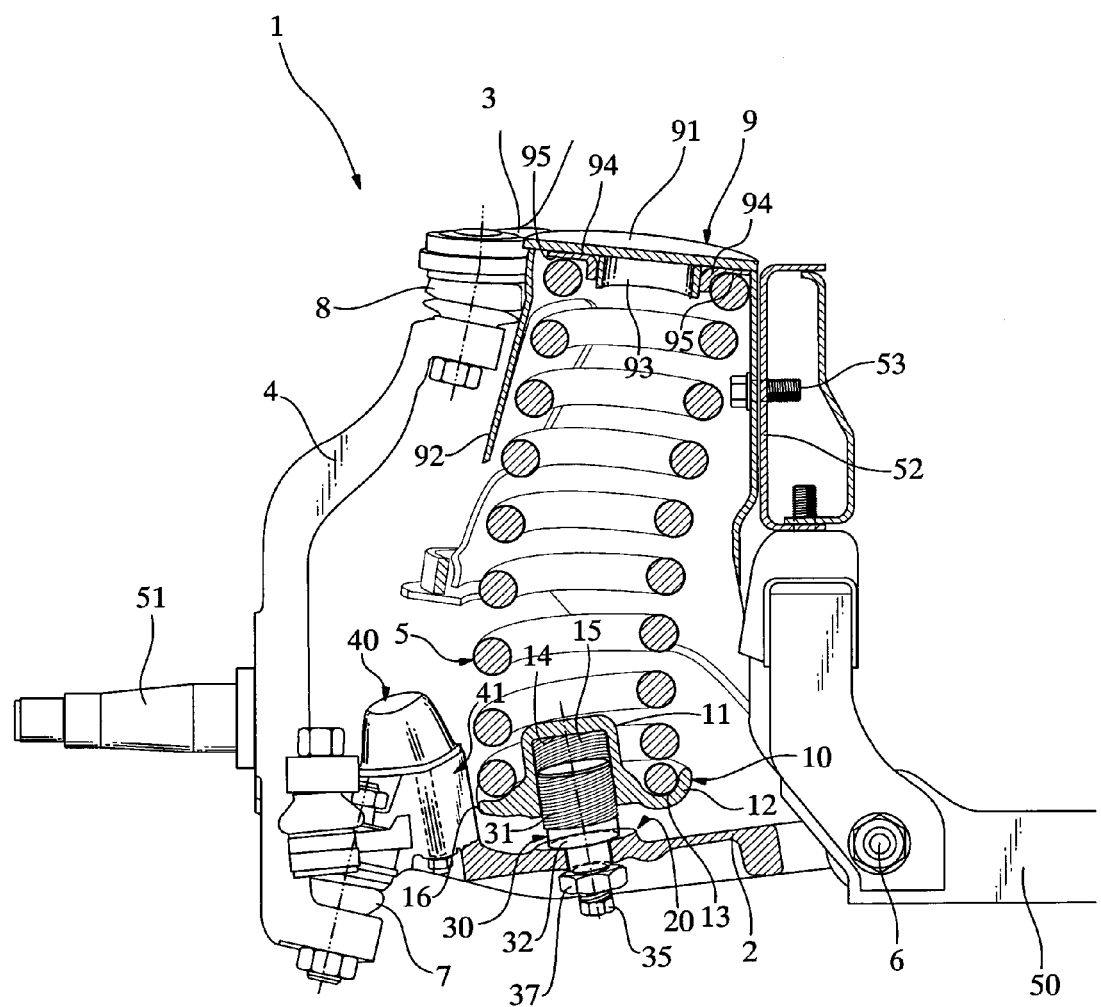
FIG. 1 is a partially cross-sectional side elevational view showing a construction of a main part of a vehicle suspension system provided with a vehicle height adjustment device according to the present invention.
Figure 2:
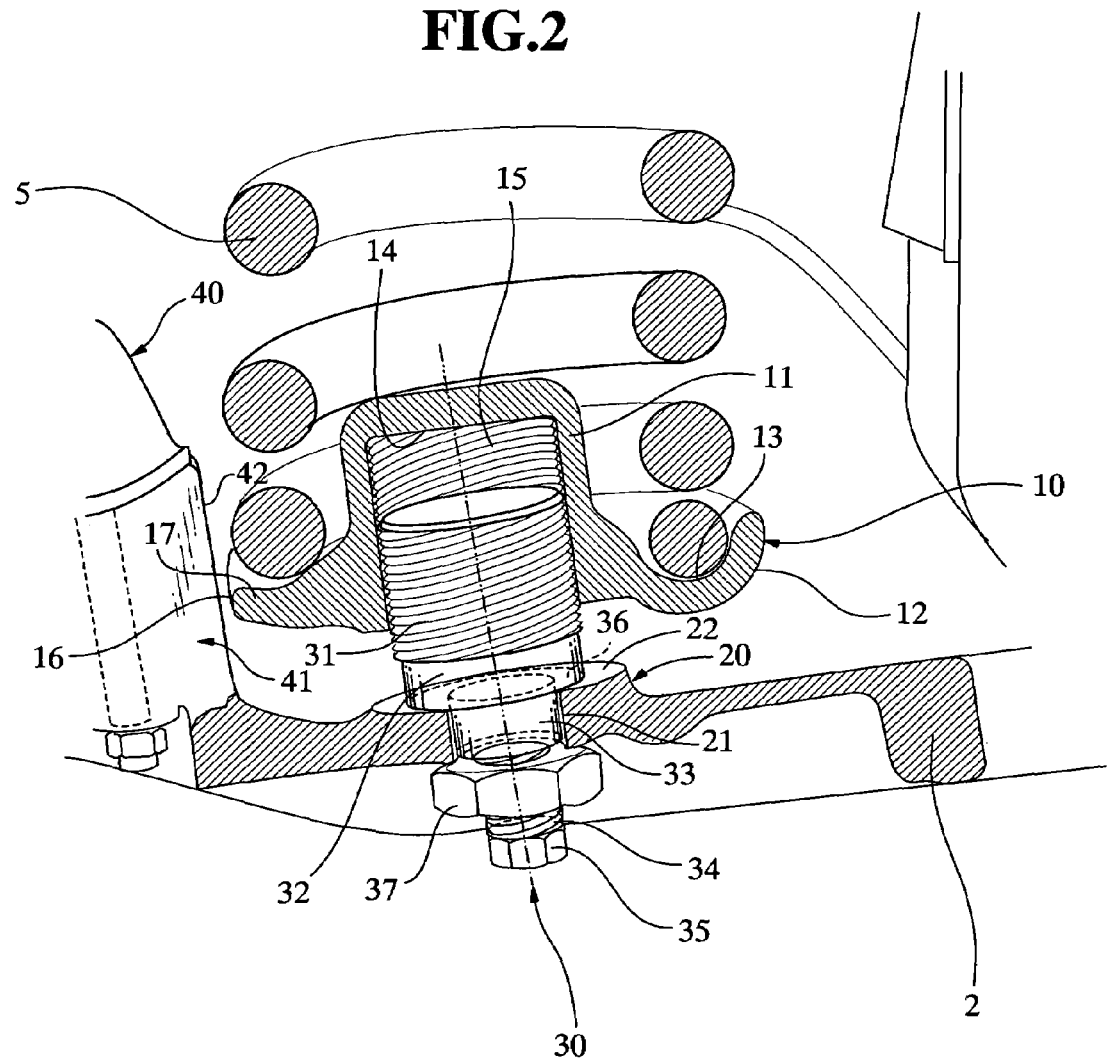
FIG. 2 is an enlarged cross-sectional view partially showing the vehicle height adjustment device as shown in FIG. 1.
Figure 3:
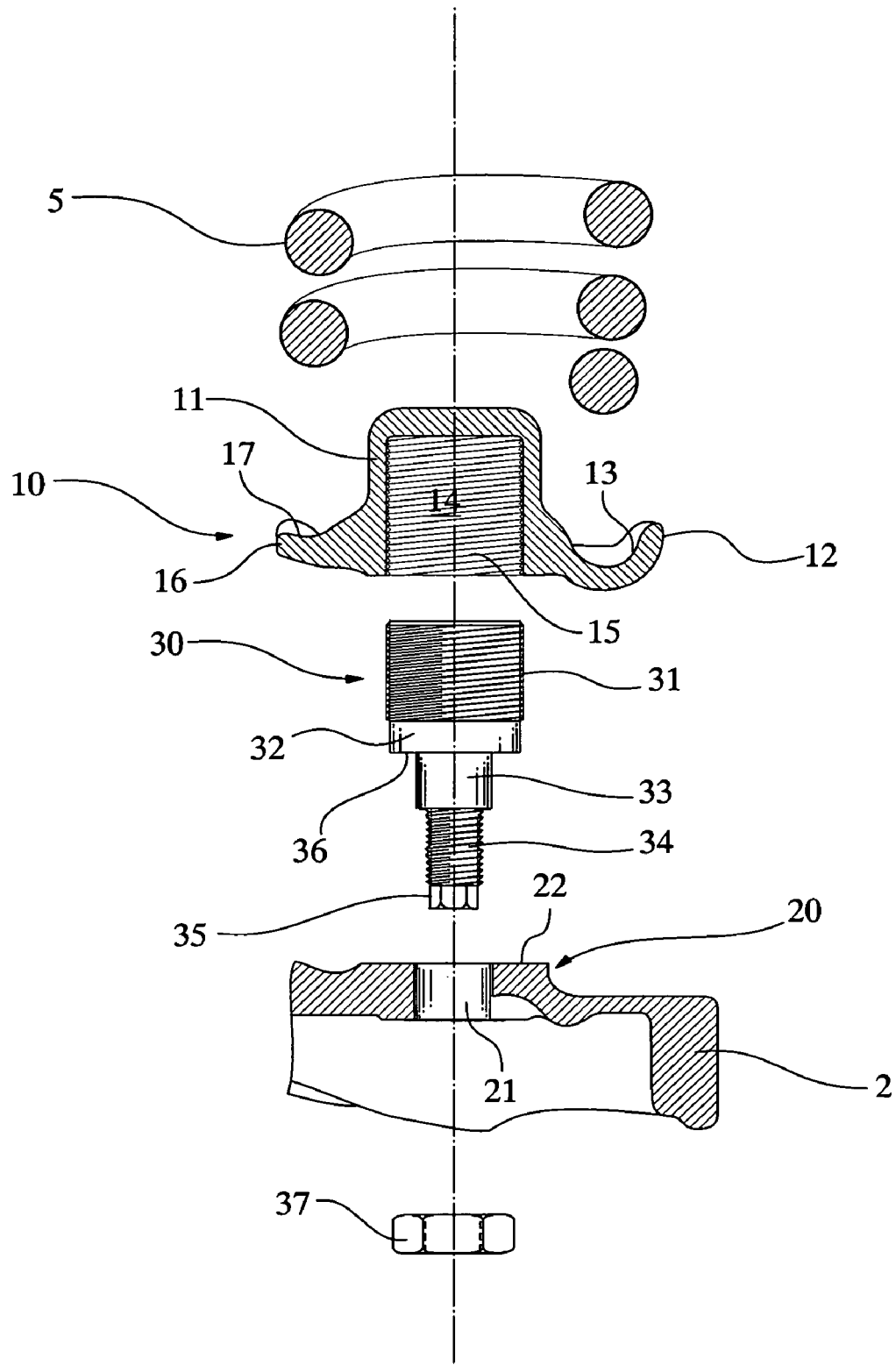
FIG. 3 is an exploded cross-sectional view of the vehicle height adjustment device as shown in FIG. 1.

FIG. 1 is a partially cross-sectional side elevational view showing a construction of a main part of a vehicle suspension system provided with a vehicle height adjustment device according to the present invention, and FIGS. 2 and 3 are an enlarged cross-sectional view and an exploded cross-sectional view partially showing the device as shown in FIG. 1.

In FIG. 1, a main part of a double-wishbone-type suspension system (wheel suspension system) 1 is illustrated. The suspension system is provided with a lower arm 2, an upper arm 3, a knuckle 4 and a compression coil spring 5. One end portion of the lower arm 2 on a side of a vehicle body (an inner end portion) is swingably mounted on a vehicle-body member 50 by means of a pivot 6, whereas the other end portion of the lower arm 2 on a side of a wheel (an outer end portion) is articulated to a lower end portion of the knuckle 4 by means of a ball joint 7. An upper end portion of the knuckle 4 is articulated to an end potion of the upper arm 3 on a side of the wheel (an outer end portion) by means of a ball joint 8. An end portion (not shown) of the upper arm 3 on a side of the vehicle body is swingably carried by the vehicle body, similarly to the lower arm 2. An intermediate portion of the knuckle 4 is equipped with a spindle 51. The spindle 51 carries the wheel (not shown) rotatably.

A coil spring bracket 9 is disposed in position adjacent to the ball joint 8 so that the bracket 9 supports the upper end portion of the compression coil spring 5. The bracket 9, which is fixedly mounted on a member 52 on a side of the vehicle body by a bolt 53, is one of vehicle-body members. The bracket 9 has a circular top plate 91 and a cylindrical cover member 92, and these members 91, 92 define an area in the bracket 9, which can accommodate a top portion of the spring 5. A cylindrical member 93 integrally formed on the top plate 91 depends from a center part of the plate 91. An annular upper seat member 94, on which an upper end portion of the spring 5 can be seated, is located around the cylindrical member 93. The member 94 is fixedly secured to the top plate 91 and the cylindrical member 93. A lower surface 95 of the member 94 in an annular form constitutes an upper spring seat which abuts against the upper end portion of the spring 5 and which bears a resilient repulsive force of the spring 5.

A lower seat member 10 is disposed in vicinity of an upper surface of the lower arm 2 so that the member 10 supports a lower end portion of the compression coil spring 5. The member 10 has an integrally combined structure constituted from a core section 11 and an annular seat section 12. The core section 11 extends into an inside hollow section of the spring, and the annular seat section 12 extends over an outer periphery of the member 10 to surround the core section 11.

A bump rubber 40 is supported by a bump rubber pedestal 41, which is disposed in position adjacent to the lower seat member 10. The pedestal 41 is integrally formed on the lower arm 2. The pedestal 41 is a wheel-side member. The pedestal 41 is located in proximity to a linear edge 16 of the annular seat section 12.

In FIG. 2, an enlarged cross-sectional view of the lower seat member 10 is illustrated.

The upper surface of the annular seat section 12 is provided with an abutment surface 13 in a form of an annular groove for accommodating the lower end portion of the coil spring 5 at least partially. The lower end portion of the spring 5 is seated on the annular groove formed by the abutment surface 13. The abutment surface 13 constitutes a lower spring seat for bearing the resilient repulsive force of the spring 5.

The core section 11 has a recess 14 which opens downward at a center of the section 11. The recess 14 has a circular cross-section and an internal thread 15 is formed on an inside circumferencial surface of the recess 14. An adjustment bolt 30, which can be screwed into the recess 14, is fixedly mounted on the lower arm 2.

As shown in FIGS. 2 and 3, the adjustment bolt 30 is provided with a large-diameter screw part 32 having an external thread 31; a small-diameter shank 33 having a round cross-section and connected to the large-diameter screw part 32; a small-diameter screw part 34 connected to the shank 33 and having an external thread; and a bolt head 35 having a hexagonal cross-section and formed on a lower end portion (tip end portion) of the small-diameter screw part 34. The screw parts 32, 34, shank 33 and bolt head 35 are aligned with one another on a center axis of the bolt 30.

The lower arm 2 is formed with a boss part 20, through which the shank 33 can be inserted. The boss part 20 has a boss hole 21 through which the shank 33 extends, and a flat bearing surface 22. The bearing surface 22 is brought into plane contact with an annular journal surface 36 of the large-diameter screw part 32. A hexagonal nut 37 is screwed on the small- diameter screw part 34 downwardly extending from the boss hole 21. When the part 34 is tightened with the nut 37, the journal surface 36 is seated on the bearing surface 22. The journal surface 36 co-operates with the nut 37 to clamp the boss part 20 under pressure, whereby the bolt 30 is securely fastened to the boss part 20.

FIG. 4 includes a plan view and a perspective view, which illustrate the positional relationship between the lower seat member 10 and the bump rubber pedestal 41.

The annular seat section 12 of the lower seat member 10 has a rotation-limiting portion 17 in a form of a flat plate. The portion 17 is provided with the linear edge 16. The linear edge 16 is positioned in close proximity to a side surface 42 of the bump rubber pedestal 41. The linear edge 16 linearly extends along the side surface 42 of the pedestal 41. If the lower seat member 10 is rotated about the center axis of the core section 11, the linear edge 16 abuts against the side surface 42 of the pedestal 41. Therefore, the pedestal 41 interferes with rotation of the member 10. According to such an arrangement, rotation of the member 10 is limited by engagement or abutment of the linear edge 16 and the side surface 42 of the pedestal 41, so that the relative rotation between the member 10 and the spring 5 is restricted. This allows the member 10 to be formed with a spring tip bearing portion 18, which can abut against a tip end 5a of a wire rod of the spring 5 (shown by phantom lines).

FIGS. 5 and 6 are cross-sectional views illustrating the relative displacement of the lower seat member 10 and the adjustment bolt 30.

As shown in FIG. 5(A), the large-diameter screw part 32 of the bolt 30 is screwed into the recess 14 of the member 10, and the small-diameter screw part 34 is tightened to the boss part 20 of the lower arm 2 with the hexagonal nut 37. The position of the member 10 relative to the bolt 30 is defined by the depth D of penetration of the screw part 32 in the recess 14. Therefore, the height H of the member 10 relative to the bearing surface 22 of the boss part 20 (i.e., the height of the surface on which the compression coil spring 5 is seated) varies in dependence on the relative rotation of the member 10 and the bolt 30. In FIGS. 5 and 6, the height H of the member 10 is indicated as a distance between the lowermost point 13a of the abutment surface 13 and the bearing surface 22.

FIGS. 5 and 6 illustrate a method of adjusting a vehicle height with rotation of the adjustment bolt 30. In operation of adjustment of the vehicle height, a rotating tool T1 such as a wrench is fitted on the hexagonal nut 37, and then, the nut 37 is rotated in its loosening direction so as to release the tightening force of the nut 37 on the boss part 20 (FIG. 5(A)). Subsequently, another rotating tool T2 such as a wrench is fitted on the bolt head 35 and the bolt head 35 is rotated (FIG. 5(B)). As the bolt head 35 is rotated, the bolt 30 is rotated as a whole. The linear edge 16 of the lower seat member 10 engages with or abuts against the side surface 42 of the pedestal 41, whereby its rotation is limited. Therefore, the member 10 is no longer able to rotate and the bolt 30 rotates independently.

When the bolt head 35 is rotated in its loosening direction as shown in FIG. 6(A), the adjustment bolt 30 is displaced with respect to the lower seat member 10 in such a manner that the large-diameter screw part 32 exits from the recess 14. As a result, the height h1 of the lower spring seat (FIG. 5(B)) increases to be the height h2.

On the contrary, if the bolt head 35 is rotated in its tightening direction, the adjustment bolt 30 is displaced with respect to the lower seat member 10 in such a manner that the large-diameter screw part 32 penetrates into the recess 14. As a result, the height h1 of the lower spring seat (FIG. 5(B)) decreases to be the height h3 (FIG. 6(B)).

Thus, the height of the vehicle body supported by the compression coil springs 5 (i.e., vehicle height) can be adjusted by adjustment of the height H of the lower seat member 10, in correspondence to the rotational direction and the rotational motion of the bolt head 35.

After adjustment of the height H of the lower seat member 10, the rotating tool T1 is fitted on the hexagonal nut 37 again and the nut 37 is rotated in its tightening direction until the nut 37 is tightened to the boss part 20, whereby the adjusted height h2, h3 of the member 10 is fixed.

As described above, the vehicle height adjustment device of this embodiment comprises the adjustment bolt 30 supported by the boss part 20 of the lower arm 2, and the lower seat member 10 threadedly engaging with the bolt 30. Since the member 10 is limited in its rotation by the bump rubber pedestal 41, the member 10 vertically moves in accordance with the rotation of the bolt 30. When the hexagonal nut 37 is tightened to the bolt 30, the bolt 30 is securely fastened to the boss part 20 of the lower arm 2. The position of the member 10 is stabilized by fixing of the bolt 30.

According to such an arrangement, the lower seat member 10 can be carried in a stable condition and the rotation of the member 10 can be restricted, without provision of a particular member for guiding the member 10 and restricting its rotation, such as a spring seat holder. Therefore, the construction of the vehicle height adjustment device can be simplified, and the number of parts or members thereof can be reduced. Such a simplified construction of the vehicle height adjustment device is superior in its operationality, stability and reliability and it is extremely advantageous in its practical use.

Although one preferred embodiment of the present invention has been described in detail, the present invention is not limited thereto, but may be modified or changed without departing from the scope of the invention defined in the accompanying claims.

For example, the present invention may be applied to the upper seat member for bearing the upper end portion of the compression coil spring, although the aforementioned embodiment has been described with respect to the lower seat member for supporting the lower end portion of the spring. In such a case, rotation of the upper seat member, which may otherwise occur owing to rotation of the adjustment bolt, is restricted by the coil spring bracket.

Further, a locking hole (a hexagonal hole or the like) engageable with a rotating tool such as hexagonal rod-like spanner may be formed on the end face of the adjustment bolt, although the adjustment bolt in the aforementioned embodiment is provided with the bolt head having a hexagonal cross-section engageable with a rotating tool.

INDUSTRIAL APPLICABILITY

The present invention is applicable to a vehicle height adjustment device and method for a vehicle suspension system having the compression coil spring interposed between a wheel-side member carrying a wheel and a vehicle-body member. The apparatus and method of the present invention can be advantageously applied, particularly, to a cab-over type truck or the like having a cockpit and so forth positioned above the suspension system.

The invention claimed is:

1. A vehicle height adjustment device for a vehicle suspension system having a compression coil spring interposed between a wheel-side member carrying a wheel and a vehicle-body member, which regulates a position of a spring seat member abutting against an end portion of the spring, so as to adjust a vehicle height, comprising:
   an adjustment bolt which is rotatably supported by the wheel-side member or the vehicle-body member and which is able to be fixedly secured to the wheel-side member or the vehicle-body member; and
   the spring seat member provided with a recess with an internal thread formed therein, which threadedly engages with said bolt, wherein rotation of said spring seat member is limited by a component of the wheel-side member or the vehicle-body member for causing a relative displacement of said spring seat member in an axial direction of rotation of said bolt in accordance with rotation of the bolt,
   wherein said bolt is securely fastened to the wheel-side member or the vehicle-body member for fixing a position of said spring seat member,
   wherein said bolt has a large-diameter screw part which is inserted into the recess and which is provided with an external thread engageable with the internal thread of the recess; a shank with a relatively small diameter, which is integral with the large-diameter screw part and which is inserted through a through-hole formed in said wheel-side or vehicle-body member; a small-diameter screw part integrally connected to or continuous with the shank; and rotating tool engagement means integrally provided on an end portion of the small-diameter screw part, and
   wherein a boss portion having said through-hole is formed in said wheel-side or vehicle-body member, and the boss portion has a flat bearing surface abutting against a step formed in a transition between said large-diameter screw part and said small-diameter shank.

2. The vehicle height adjustment device as defined in claim 1, wherein a core section of said spring seat member formed with said recess extends into an inside hollow section of said compression coil spring.

3. The vehicle height adjustment device as defined in claim 1, further comprising
   a screw-engaging member threadedly engaging with the small-diameter screw part on a side opposite to the large-diameter screw part with respect to said wheel-side or vehicle-body member, wherein said bolt is securely fastened to said wheel-side or vehicle-body member by a tightening force of the screw-engaging member and the bolt can be rotated when the screw-engaging member is loosened.

4. The vehicle height adjustment device as defined in claim 1, wherein said component of the wheel-side member is a bump rubber pedestal.

5. The vehicle height adjustment device as defined in claim 1, wherein said component of the vehicle-body member is a coil spring bracket.

6. A vehicle height adjustment device for a vehicle suspension system having a compression coil spring interposed between a wheel-side member carrying a wheel and a vehicle-body member, which regulates a position of a spring seat member abutting against an end portion of the spring, so as to adjust a vehicle height, comprising:
   an adjustment bolt which is rotatably supported by the wheel-side member or the vehicle-body member and which is able to be fixedly secured to the wheel-side member or the vehicle-body member;
   the spring seat member which threadedly engages with said bolt; and
   rotation restriction means provided on the wheel-side member or the vehicle-body member for restricting rotation of the spring seat member by abutting against the rotated spring seat member;
   wherein said spring seat member is provided with a recess in which a thread is formed;
   wherein said bolt is provided with a large-diameter screw part threadedly engaging with said recess, a small-diameter shank integrally connected to or continuous with said large-diameter screw part, securing means for releasably fastening the small-diameter shank to the wheel-side member or the vehicle-body member, and engagement means for engaging with a rotating tool for rotating said shank;
   wherein said shank extends through a through-hole formed in the wheel-side member or the vehicle-body member;
   wherein said wheel-side member or the vehicle-body member is formed with a bearing surface, which is in plane contact with a step formed in a transition between said large-diameter screw part and said small-diameter shank so as to rotatably carry said bolt on said wheel-side or vehicle-body member, and
   wherein said step forms an annular journal surface which is seated on said bearing surface.

7. The vehicle height adjustment device as defined in claim 6, wherein said securing means co-operates with said step so as to clamp said wheel-side or vehicle-body member and to securely fasten said bolt thereto.

8. The vehicle height adjustment device as defined in claim 6, wherein said engagement means is positioned on an end portion of said small-diameter shank of said bolt for engagement with a rotating tool on a side of said wheel-side or vehicle-body member opposite to said large-diameter screw part.

9. A method for adjusting a vehicle height comprising:
   providing vehicle height adjustment device for a vehicle suspension system as defined in claim 1;
   releasing and rotating said adjustment bolt rotatably mounted on said wheel-side or vehicle-body member and threadedly engaging with said spring seat member;
   restricting rotation of the spring seat member by abutment of the spring seat member against said component of the wheel-side or vehicle-body member, for converting a torque exerted on the bolt to a motion of the spring seat member in an axial direction of rotation, thereby causing displacement of said spring seat member in the axial direction of rotation of said bolt; and
   fixedly securing said bolt on the wheel-side or vehicle-body member.

10. A method for adjusting a vehicle height as defined in claim 9, wherein the shank externally protrudes through said through-hole, and said bolt is released, rotated and fastened on the side opposite to said spring seat member with respect to said wheel-side or vehicle-body member.

11. A method for adjusting a vehicle height as defined in claim 10, wherein said spring seat member is a lower seat member supporting the lower end portion of said coil spring, and release, rotation and fastening of said bolt are carried out from the underside of said suspension system.

12. A method for adjusting a vehicle height comprising:

providing a vehicle height adjustment device for a vehicle suspension system as defined in claim 9;

releasing and rotating said adjustment bolt rotatably mounted on said wheel-side or vehicle-body member and threadedly engaging with said spring seat member;

restricting rotation of the spring seat member by abutment of the spring seat member against said rotation restriction means, for converting a torque exerted on the bolt to a motion of the spring seat member in an axial direction of rotation, thereby causing displacement of said spring seat member in the axial direction of rotation of said bolt; and fixedly securing said bolt on the wheel-side or vehicle-body member.

13. A method for adjusting a vehicle height as defined in claim 12, wherein the shank externally protrudes through said through-hole, and said bolt is released, rotated and fastened on the side opposite to said spring seat member with respect to said wheel-side or vehicle-body member.

14. A method for adjusting a vehicle height as defined in claim 13, wherein said spring seat member is a lower seat member supporting the lower end portion of said coil spring, and release, rotation and fastening of said bolt are carried out from the underside of said suspension system.

* * * * *